(12) United States Patent
Lemens

(10) Patent No.: US 6,675,855 B1
(45) Date of Patent: Jan. 13, 2004

(54) CARTRIDGELESS FEED ROLL ASSEMBLY

(75) Inventor: Paul J. Lemens, Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 54 days.

(21) Appl. No.: 10/141,850

(22) Filed: May 10, 2002

Related U.S. Application Data

(60) Provisional application No. 60/290,988, filed on May 16, 2001, and provisional application No. 60/331,762, filed on Nov. 21, 2001.

(51) Int. Cl.[7] .............................................. B32B 31/00
(52) U.S. Cl. ...................... 156/555; 156/582; 156/583.1
(58) Field of Search ................................ 156/522, 555, 156/579, 580, 582, 583.1; 100/155 R, 160, 176

(56) References Cited

U.S. PATENT DOCUMENTS

| | | | |
|---|---|---|---|
| 3,309,983 A | * | 3/1967 | Dresser .................. 156/555 X |
| 3,737,359 A | * | 6/1973 | Levitan ...................... 156/522 |
| 5,580,417 A | | 12/1996 | Bradshaw |
| 5,584,962 A | | 12/1996 | Bradshaw et al. |
| 5,735,998 A | | 4/1998 | Bradshaw |
| 5,788,806 A | | 8/1998 | Bradshaw et al. |
| 6,146,490 A | | 11/2000 | Ensign |
| 6,244,322 B1 | | 6/2001 | Paque |
| 6,335,067 B1 | | 1/2002 | O'Keefe et al. |
| 6,431,243 B1 | * | 8/2002 | Ito et al. ...................... 156/555 |

* cited by examiner

*Primary Examiner*—James Sells
(74) *Attorney, Agent, or Firm*—Pillsbury Winthrop LLP

(57) ABSTRACT

The present application discloses a cartridgeless feed roll assembly package to be used in conjunction with a master processing apparatus for processing a master. The processing assembly is constructed and arranged to perform a master processing operation wherein cooperating structures apply pressure to substrates received therebetween and then subsequently discharge the substrates. The packaged cartridgeless feed roll assembly comprises a feed roll assembly comprising a first feed roll carrying a supply of a first stock material; and a second feed roll carrying a supply of a second stock material. The feed rolls are joined together without the use of a cartridge body structure as a result of the lead end portions of the stock materials being secured together with side edges of the stock materials substantially aligned with one another. The first and second feed rolls are removably and individually mountable to the frame to enable the secured lead end portions of the stock materials to be fed together between the cooperating structures of the master processing assembly so as to enable the aforesaid master processing operation to be performed. The packaged assembly further comprises a feed roll assembly package, the first and second feed rolls being received in the package such that the package limits relative movement of the feed rolls in a manner that prevents the lead end portions of the feed rolls from becoming separated from one another.

15 Claims, 7 Drawing Sheets

CARTRIDGELESS FEED ROLL ASSEMBLY

The present application claims priority to U.S. Provisional Applications of Paul Lemens, Application No. 60/290,988, filed May 16, 2001, and Application No. 60/331,762, filed Nov. 21, 2001, the entirety of which are hereby incorporated into the present application by reference.

FIELD OF THE INVENTION

The present invention relates to packaged cartridgeless feed roll assembly for use with a master processing apparatus.

BACKGROUND OF THE INVENTION

It is a common practice to protect documents and other items such as business cards by laminating them in clear plastic coverings. It is also a common practice to make articles such as stickers and labels by a process of adhesive transfer. U.S. Pat. Nos. 5,584,962 and 5,580,417 are directed to devices which are capable of performing both laminating and adhesive transfer operations.

Typically, the feed roll assemblies of such devices are provided by separate, unjoined feed rolls (as in the '962 patent) or self-contained cartridge assemblies wherein the feed rolls are joined together by a cartridge for mounting to the apparatus (as in the '417 patent). With separate feed rolls, much of the feed material may be wasted when aligning the lead end portions thereof for insertion into the master processing assembly of the apparatus. In particular, the user may misaligned the lead end portions of the stock materials when adhering the same together and the misaligned ends must be cut off, discarded and the user must then attempt to properly align the new lead portions. To this end, prior art self-contained cartridge assemblies have had feed rolls rotatably mounted within them with their lead end portions adhered together in properly aligned fashion for mounting to the apparatus and easy insertion of the lead end portions into the master processing assembly of the apparatus. Although these cartridges greatly facilitate the use for the end user, additional manufacturing steps and parts are required to produce these cartridge assemblies, thus making them a more expensive alternative.

U.S. Pat. No. 6,146,490 discloses a web feed leader designed to help the end user align the lead end portions of the stock materials for insertion between the nip rollers of a master processing apparatus. Although the leader of the '490 patent is useful and helps to reduce the waste associated with failed attempts to properly align the stock material lead end portions, it does not entirely eliminate that problem.

Consequently, it would be desirable to provide a feed roll assembly that has the advantages of cartridge-based feed roll assemblies and feed roll assemblies having separate and unjoined feed rolls.

SUMMARY OF THE INVENTION

It is therefore an object of the present invention to meet the above-mentioned need. In order to achieve this object, the present invention provides a cartridgeless feed roll assembly package to be used in conjunction with a master processing apparatus for processing a master, the apparatus comprising a frame, and a master processing assembly comprising a pair of cooperating structures constructed and arranged to receive substrates therebetween. The processing assembly is constructed and arranged to perform a master processing operation wherein the cooperating structures apply pressure to the substrates received therebetween and then subsequently discharge the substrates. The packaged cartridgeless feed roll assembly comprises a feed roll assembly comprising a first feed roll carrying a supply of a first stock material having a lead end portion; and a second feed roll carrying a supply of a second stock material having a lead end portion, at least one of the first and second stock materials carrying a layer of adhesive. The feed rolls are joined together without the use of a cartridge body structure as a result of the lead end portions of the stock materials being secured together with side edges of the stock materials substantially aligned with one another. The first and second feed rolls are removably and individually mountable to the frame to enable the secured lead end portions of the stock materials to be fed together between the cooperating structures of the master processing assembly so as to enable the aforesaid master processing operation to be performed by advancing the master and the stock materials through the master processing assembly with the cooperating structures applying pressure to the stock materials so as to cause adhesive bonding between the stock materials and the master and then subsequently discharge the processed master and stock materials.

The packaged assembly further comprises a feed roll assembly package, the first and second feed rolls being received in the package such that the package limits relative movement of the feed rolls in a manner that prevents the lead end portions of the feed rolls from becoming separated from one another.

Other objects, features, and advantages of the present invention will become apparent from the following detailed description, the accompanying drawings, and the appended claims.

DETAILED DESCRIPTION OF THE PREFERRED EMBODIMENT OF THE INVENTION

Figure 1:
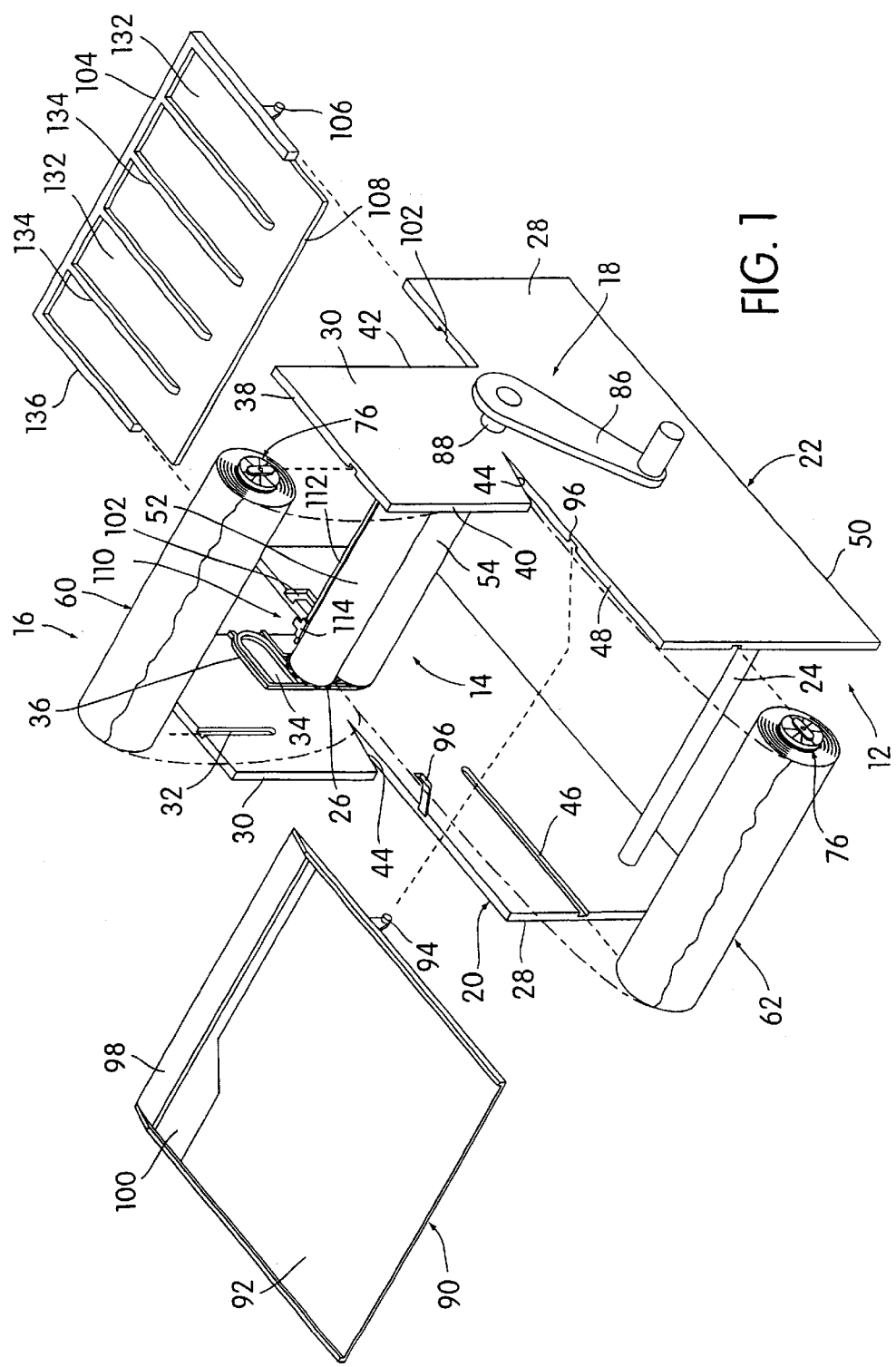
FIG. 1 is a perspective view of an apparatus for processing a master.

FIG. 1 illustrates an apparatus, generally indicated at 10, for processing a master. The apparatus 10 illustrated is in the form of a laminating and adhesive transfer device and comprises a frame, generally indicated at 12, that supports a master processing assembly, generally indicated at 14, a cartridgeless feed roll assembly, generally indicated at 16, and an actuator, generally indicated at 18. The processing apparatus may have any suitable construction and may be designed for either laminating or adhesive transfer alone. Further, the apparatus could be designed with or without heating elements as part of its master processing assembly.

The frame 12 includes a pair of molded plastic side walls 20, 22 disposed parallel to one another in spaced relationship and extending upward in a generally vertical direction. The vertical side walls 20, 22 are secured in spaced relation by a pair of transversely extending spacer rods, one of which is indicated at 24. On the interior of each side wall 20, 22 is an upwardly facing U-shaped receiving slot 26 extending from a lower side wall portion 28 to an upper side wall portion 30 as best seen in FIG. 1.

The upper side wall portions 30 are made of plastic and each have a vertically extending mounting projection receiving slot 32 on their interior. As best shown in FIG. 1, a spring receiving slot 34 defined by inwardly projecting ribs extends inwardly from the rear side of the apparatus 10 along the interior of each upper side wall portion 30 and opens to the U-shaped slot 26. A generally U-shaped metal spring 36 is snugly fit into each spring receiving slot 34 such that the legs of the U-shaped spring 36 extend inwardly away from the rear of the apparatus 10 and across the top of the upwardly facing U-shaped slot 26. The upper side wall portions 30 are shown as each having a top edge 38 and front and rear edges 40 and 42, respectively. An angular surface 44 extends between the front edge 40 and the lower side wall portion 28 for allowing a tapered lead end of a feed tray assembly 90 to be positioned in close proximity to the master processing assembly 14.

Figure 2:
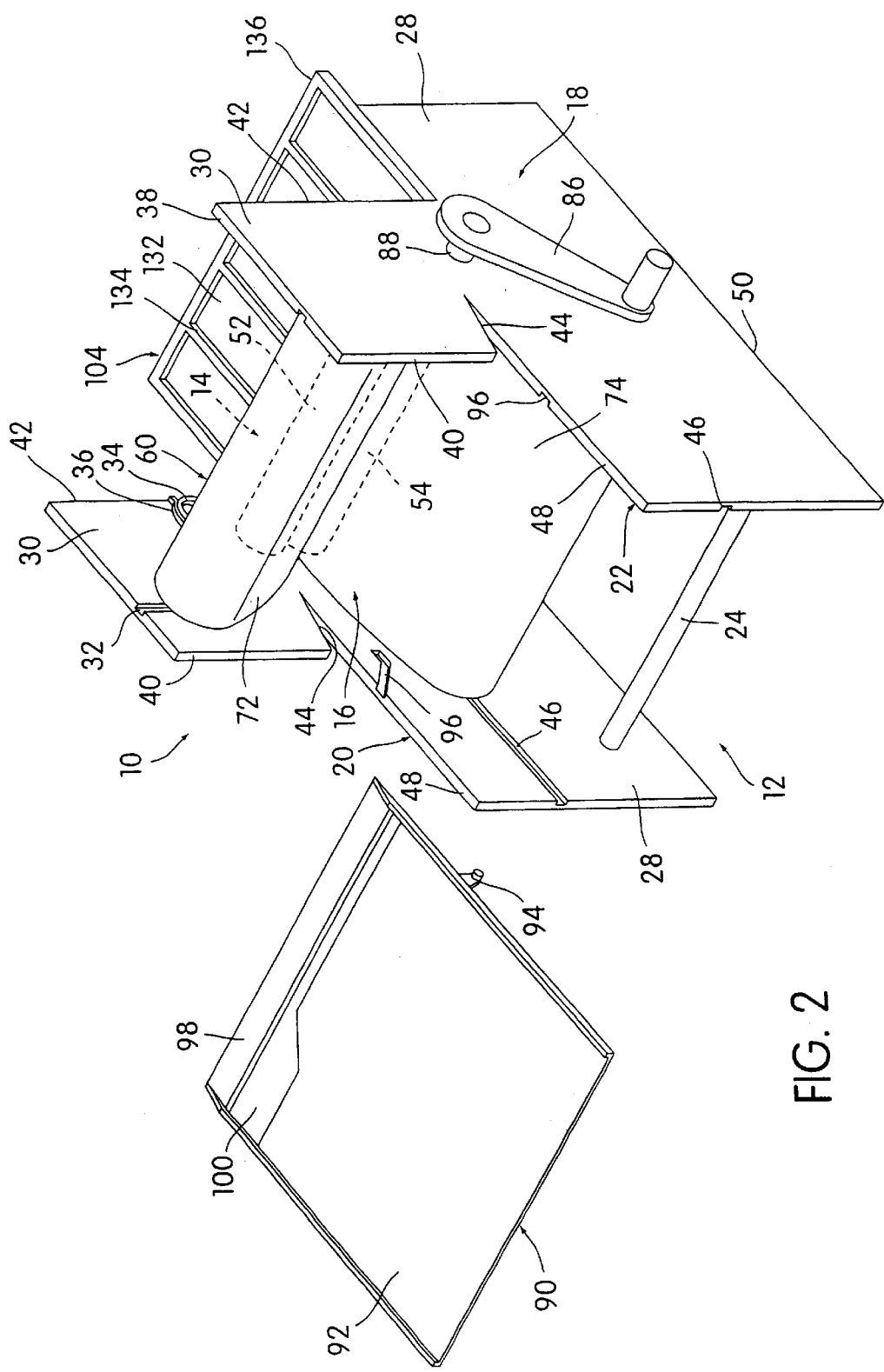
FIG. 2 is a perspective view of the apparatus of FIG. 1 with the cartridgeless feed roll assembly mounted within the apparatus for processing a master.
Figure 3:
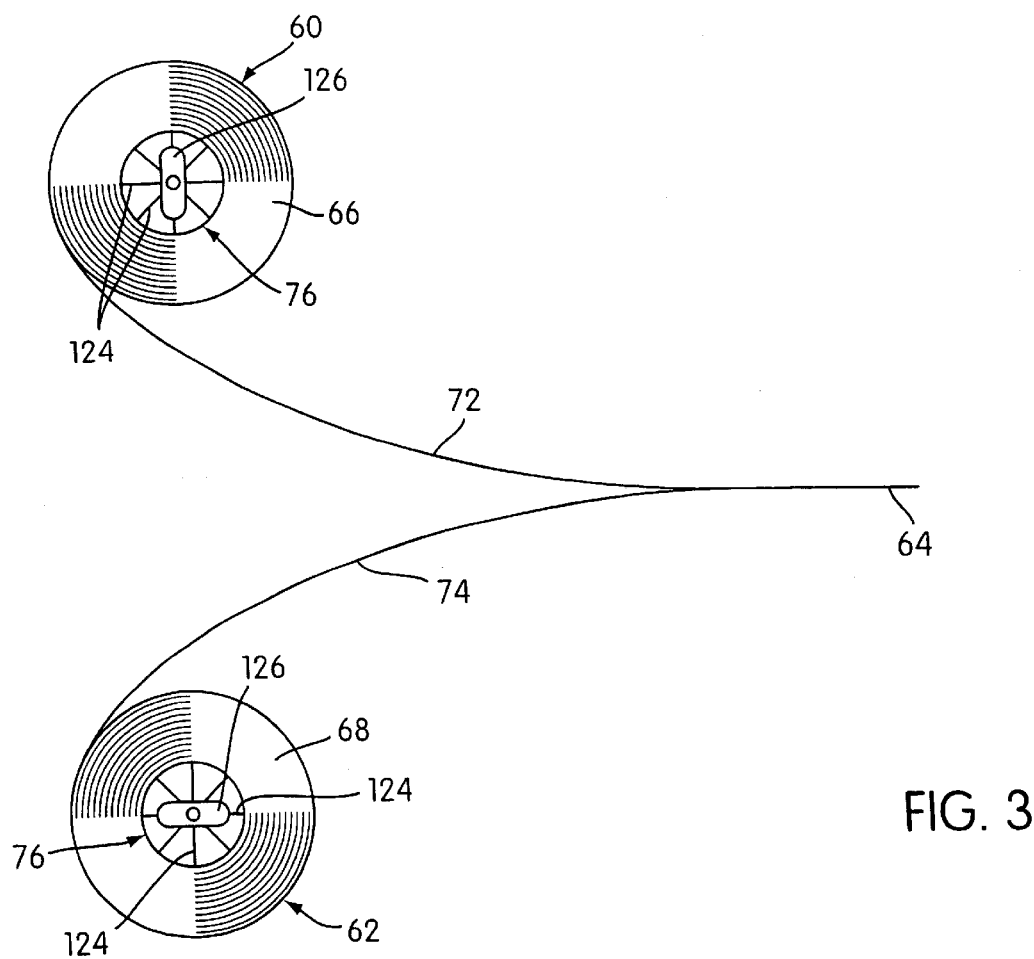
FIG. 3 is a side plan view of the cartridgeless feed roll assembly of the present invention.
Figure 3A:
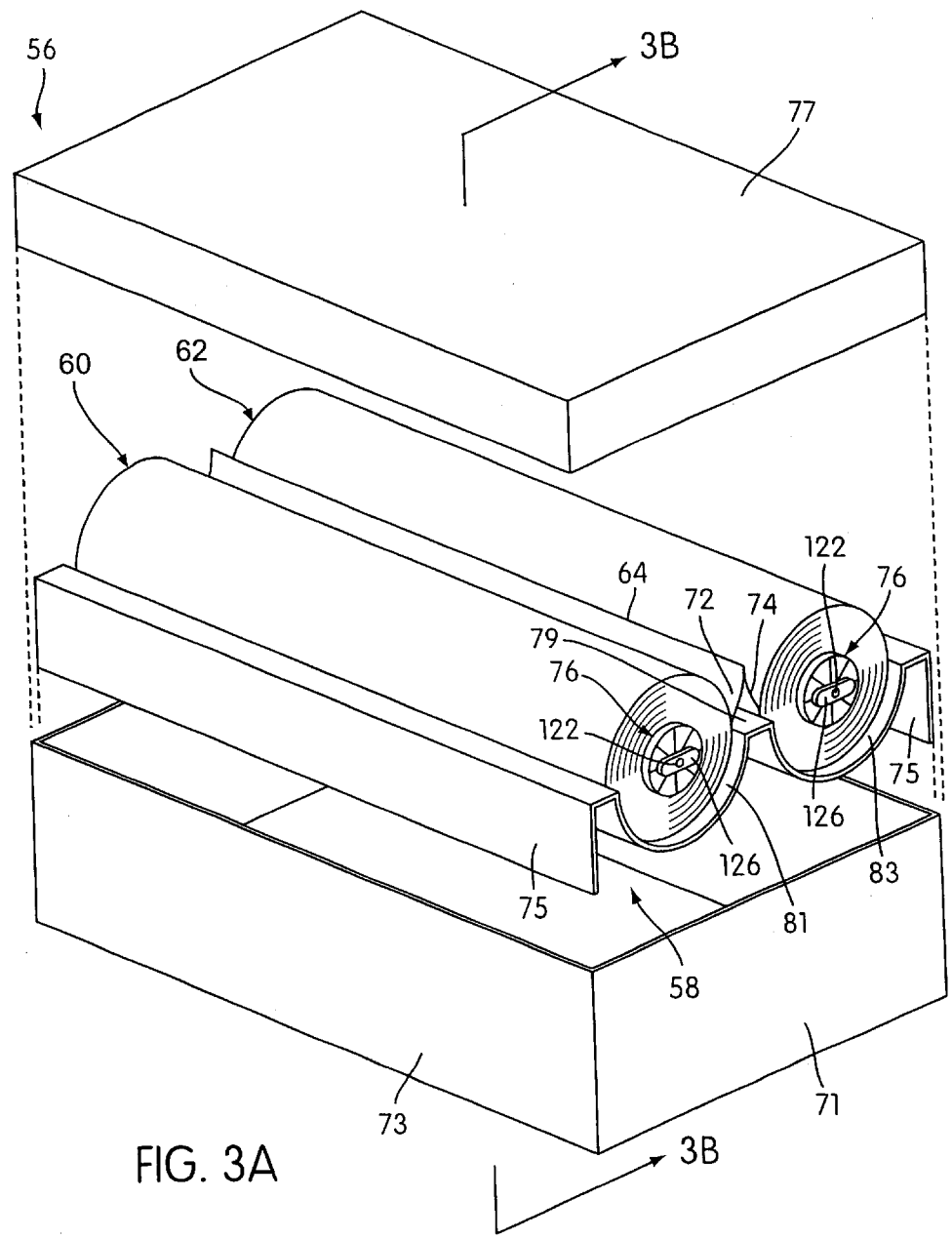
FIG. 3A is an exploded perspective view of feed roll packaging structure with the feed roll assembly of the invention mounted therein for shipping.
Figure 3B:
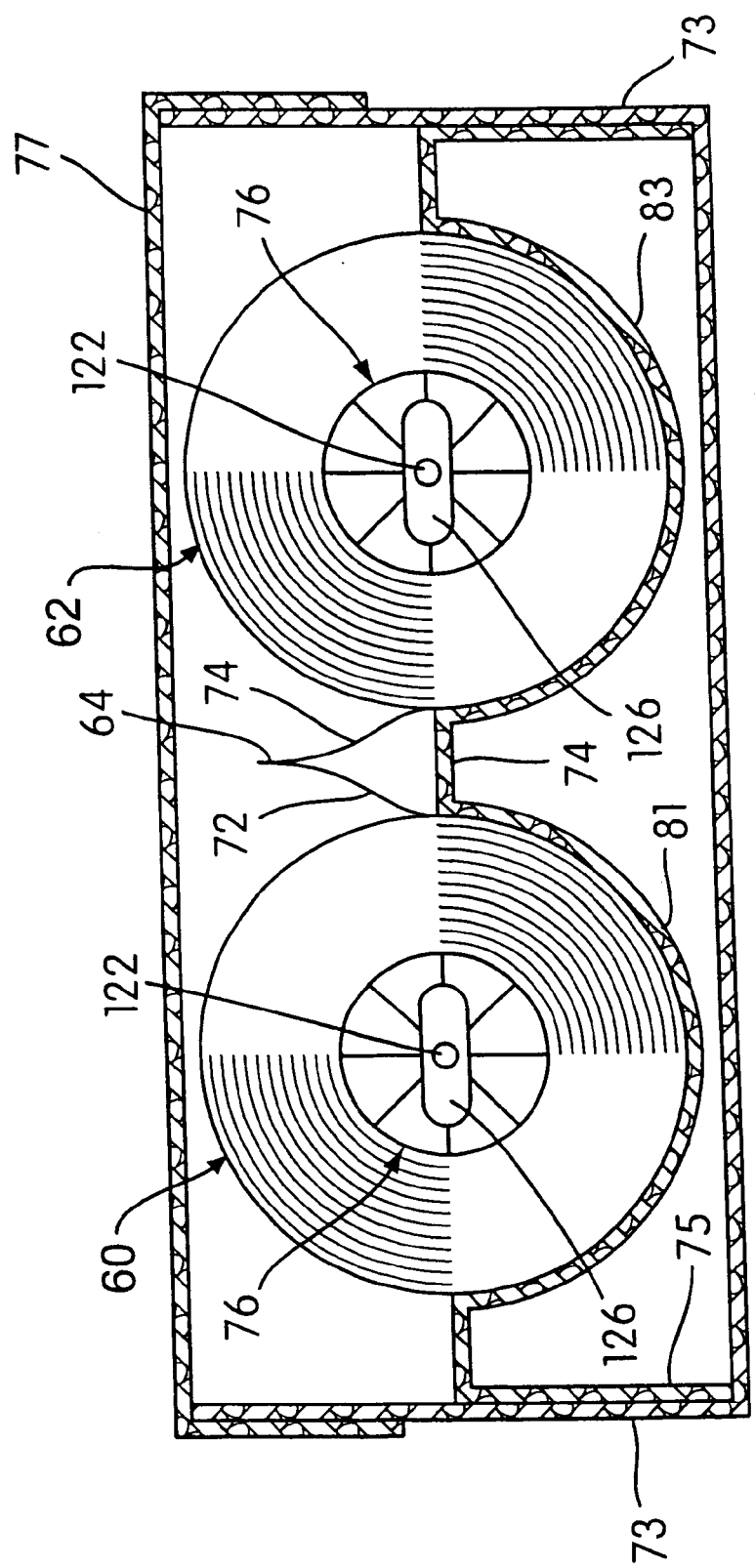
FIG. 3B is a cross-sectional view taken along line 3B—3B of FIG. 3A.

The lower side wall portions 28 are made of plastic and have horizontal slots 46 in their inner surfaces. The slots 46 extend inwardly from the front edge 40 of the apparatus 10. As best shown in FIGS. 1 and 2, the lower side wall portions 28 and are shown as generally rectangular having a top edge 48 and a bottom edge 50. The bottom edge 50 serves as a flat surface for the apparatus 10 to be flushly placed upon a flat surface such as a desktop or the like for support. Each horizontal top edge 48 abuts the angular surface 44 of each of the upper side wall portions 30.

The master processing assembly 14 comprises a pair of cooperating structures 52, 54, in the form of rotatable nip rollers extending transversely between the vertical side walls 20, 22, respectively. The upper cooperating structure 52 extends transversely between the upper side wall portions 30 and is rotatably retained in the U-shaped receiving slot 26. The lower cooperating structure 54 extends transversely between the lower side wall portion 32 and is rotatably retained below the upper cooperating structure 52 in the U-shaped receiving slot 26. By extending across the top of the U-shaped slots 26, the lower leg of each U-shaped spring 36 contacts the axle of the upper cooperating structure 52, as best shown in FIG. 1. The U-shaped spring 36 applies generally downward pressure to the axle to thereby retain the master processing assembly 14 in the upwardly facing U-shaped slots 26 and forcing the peripheral surfaces of the nip rollers in cooperating rolling contact with one another. As best shown in FIGS. 1 and 2, the upper and lower cooperating structures 52, 54 are preferably designed to engage each other in a rolling relation so as to define a nip area where the upper and lower cooperating structures 52 and 54 meet and to exert pressure on substrates or films fed therebetween into the nip area.

The master processing assembly 14 may take any form suitable for applying pressure to substrate materials fed therebetween. For example, one of the rotatable nip rollers may be replaced by a fixed cooperating structure. Also, the processing assembly could be provided with heating platens for activating a heat-sensitive adhesive.

The cartridgeless feed roll assembly 16 includes an upper feed roll 60 and a lower feed roll 62 (also referred to as first and second) each containing stock materials 66 and 68, respectively, wound around generally cylindrical feed roll cores 70. The lead end portions 72 and 74 of the stock materials 66, 68, respectively, are bonded together by the layers of pressure-sensitive adhesive provided thereon to form a bonded lead end portion 64 prior to delivery to the end user. The alignment is such that the side edges are substantially aligned. Alternatively, the lead end portions 62, 64 could be clipped together by a metal or plastic clip, which may be especially useful where the adhesive is heat-sensitive and thus does not readily bond without heat activation. The clip should have a small enough thickness to pass between the cooperating structures of the master processing apparatus along with the lead end portions 72, 74. Preferably, the interior of the clip is provided with a roughened surface or projections that pierce the lead end portions 72, 74 to prevent relative movement between the lead end portions 72, 74. In another alternative where heat-sensitive adhesive is used, hear may be applied to the lead end portion 72, 74 to activate that adhesive to affect the bonding.

A feed roll assembly packaging structure, generally indicated at 56, is illustrated in the form of an outer shell defining a shipping box and comprises a pair of transversely extending walls 71 perpendicularly intersected by a pair of longitudinal walls 73, a removable insert member 58, and a removable cover element 77. The removable insert 58 is bent and configured to include a pair of side walls 75 and a raised central portion 79 defining a pair of generally semi-circular recesses 81, 83 defining feed roll receiving surfaces. The recesses 81, 83 longitudinally extend between the opposing transversely extending front and rear walls 71 so that the surfaces thereof receive and support the upper and lower feed rolls 60, 62, respectively, therein in nested relation. These surfaces of the grooves 81, 83 prevent relative movement of feed rolls 60, 62 during shipping and delivery, thus keeping the lead ends 72, 74 forming the bonded lead end portion 64 from being peeled apart and unjoined. The removable cover element 77 extends across the top of the recessed grooves 81, 83 to further retain the upper and lower feed rolls 60, 62 the hold the same within the recesses 81, 83 against upward movement. The packaging structure .56 illustrated is made from cardboard, plastic or any other suitable material. The packaging structure 56 and the removable insert thereof may take any form suitable for preventing relative movement of the upper and lower feed rolls 60, 62 during shipping and delivery thereof prior to the end user with any type of packaging, including cardboard, tape, removable temporary end caps or any combination thereof.

Basically, the feed roll receiving surfaces are constructed and arranged to support the feed rolls of the feed roll assembly in such a manner that the feed rolls are prevented from moving apart from one another a sufficient distance to separate the bonded lead end portions at 64 from one another. The feed roll assembly is carried by the packaging structure 56 with the feed roll receiving surfaces supporting the feed rolls as aforesaid. Any packaging structure for achieving this purpose may be used within the scope of the invention and the invention is not to be limited to the specific construction illustrated.

Each of the upper and lower feed rolls 60, 62 carry feed roll mounting structures 76, one on each opposite longitudinal end thereof. These feed roll mounting structures are constructed and arranged to mount the feed rolls 60, 62 to the frame of the apparatus 10. Each mounting structure 76 comprises an annular protecting ring 78, a generally cylindrical mounting cap 80, a fastener 82, and an end cap 84, arranged to removably and individually mount the upper and lower (also referred to as first and second) feed rolls 60, 62 to the frame 12, as shall be described below.

It is to be understood that the use of feed roll mounting structures is not necessary. Instead, the apparatus could be designed with concave supporting structures for receiving the rolls therein without the use of feed roll mounting structures. Further, the apparatus could have projections that are received within the core of the feed rolls to retain the same on the apparatus.

As is best seen in FIGS. 1 and 2, the master processing apparatus 10 also includes an actuator 18. The actuator 18 has a crank handle 86 having a shaft 88 extending inwardly through an opening in side wall 22 to the interior of the apparatus 10 and is connected to the lower cooperating structure 54. Although not shown, the end of the shaft 88 is threaded and the lower cooperating structure 54 has a threaded bore (not shown) that receives the threaded end of the shaft 88 of the crank handle 86, thereby operatively connecting the crank handle 86 of the actuator 18 to the lower cooperating structure 54. As a result, manual rotation of the handle 86 rotates the lower cooperating structure 54.

The feed tray assembly 90 provides a planar upper surface 92 and mounting projections 94 extending outwardly from each side. The mounting projections 94 are removably insertable in slots 96 formed on the top edges 48 of the lower side wall portions 28. The feed tray assembly 90 also has a tapered edge 98 disposed immediately adjacent the forward or leading side of the nip area when the feed tray assembly 90 is mounted onto the lower side wall portions 28. The feed tray assembly has a wiper bar 100 that extends transversely across the planar upper surface 92 of the feed tray assembly 90. The wiper bar 100 is pivotally mounted to the sides of the feed tray assembly 90 by projections (not shown) which are removably inserted into the side walls of the feed tray assembly 90.

As shown in FIGS. 1 and 2, an exit tray receiving slot 102 extends downwardly from the rearward top edge 48 on each of the side walls 20, 22 at a position immediately inward from the rear or discharge side of the apparatus 10. An exit tray assembly 104, as shown in FIGS. 1 and 2, has a set of mounting tabs 106 extending outwardly therefrom adjacent a lip 134, which is further described below. The mounting tabs 106 are configured to be received in the exit tray receiving slots 102 on each side wall 20 and 22 to mount the tray assembly 104 in its operating position. A cutting assembly 110 includes a steel cutter bar 112 and a slidable blade mounting structure 114 slidably mounted on the cutter bar 112. The cutter bar 112 extends transversely between the lower side wall portions 28 and rearwardly of the upper and lower cooperating structures 52 and 54, as shown in FIG. 1.

A groove (not shown) extends along the length of the cutter bar 112 and is configured to engage the slidable blade mounting structure 114. A blade (not shown) extends downwardly from the blade mounting structure 114. A tab (not shown) extends inwardly from the blade mounting structure 114 and is inserted through a hole (not shown) formed at the top of the blade and is slidably engaged in the groove. The slidable blade mounting structure 114 has a front side, a back side, and a top side which are formed together continuously and open downwardly to fit over the upper edge of the cutter bar 112 with the aforementioned tab slidably engaged in the groove. A protrusion (not shown) extends outwardly from the slidable blade mounting structure 114 to facilitate operation of the cutting assembly 110. Thus, the slidable blade mounting structure 114 can be slid transversely with respect to the apparatus 10 along the length of the cutter bar 112 between the lower side wall portions 28.

In the illustrated embodiment, each of the upper and lower cooperating structures 52, 54 include an elongated steel shaft (not shown) with a rubber outer cover extending longitudinally thereon. Each shaft has an axle (not shown) extending axially with respect to the shaft from opposite ends. Upper and lower bushings (not shown) fit on the ends of the respective axles and are configured to be snugly fit in the upwardly facing U-shaped slot 26, thereby allowing the rollers of the master processing assembly 14 to be rotatably mounted in the upwardly facing U-shaped slot 26 as discussed above.

The axle of the lower cooperating structure 54 opposite the crank handle 86 is knurled such that a set of axially extending grooves (not shown) are disposed about the circumference of the axle immediately adjacent the aforementioned lower bushing. The knurled portion of the axle is configured to fixedly receive a lower pinion gear (not shown) thereon. Likewise, the axle of the upper cooperating structure 52 is knurled such that a set of axially extending grooves (not shown) are disposed about the circumference of the axle immediately adjacent the aforementioned upper bushing. An upper pinion gear (not shown) is fixedly mounted upon the knurled portion of the axle of the upper cooperating structure 52. The lower pinion gear of the lower cooperating structure 54 and the upper pinion gear of the tipper cooperating structure 52 are constructed and arranged to engage one another such that manually operating the crank handle 86 rotates both the upper and lower cooperating structures 52, 54. The cooperating structures 52, 54 counter-rotate in opposite directions with respect to one another, thereby advancing substrates or film to be fed into the nip area therethrough as the crank handle 86 is turned. It is also contemplated that the master processing assembly 14 may be driven by an electric motor or other similar powered actuating means rather than by manual operation of the crank handle 86. Further, the apparatus may be devoid of an actuator and the materials may simply be pulled through the processing assembly by hand.

As indicated above, the apparatus 10 may be used for multiple purposes including both adhesive transfer and lamination. Also, the apparatus 10 may be any type of master processing apparatus capable of applying pressure to substrates fed into the processing assembly 14 thereof. The stock materials 66 and 68 may comprise film or other flexible substrate material with at least one of the stock materials carrying a layer of pressure-sensitive adhesive.

Figure 4:
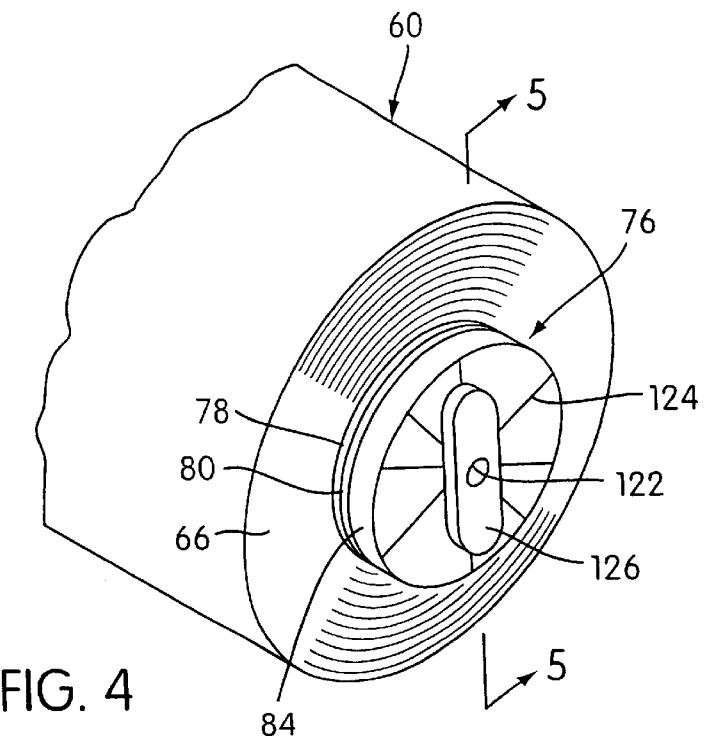
FIG. 4 is a close-up partial perspective view of one end of a feed roll in the cartridgeless feed roll assembly of the invention to better illustrate the mounting structure.
Figure 5:
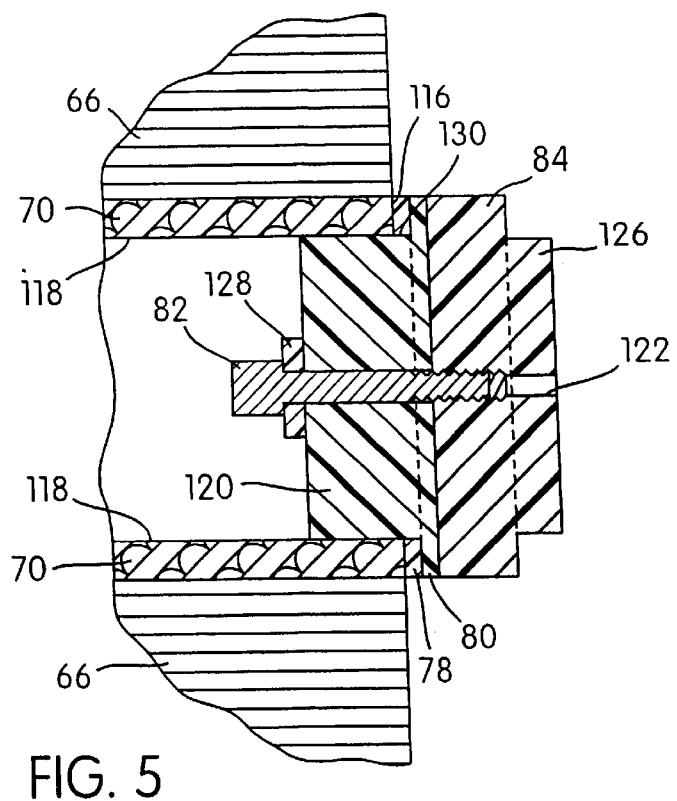
FIG. 5 is a cross-sectional view taken along line 5—5 of FIG. 4.
Figure 6:
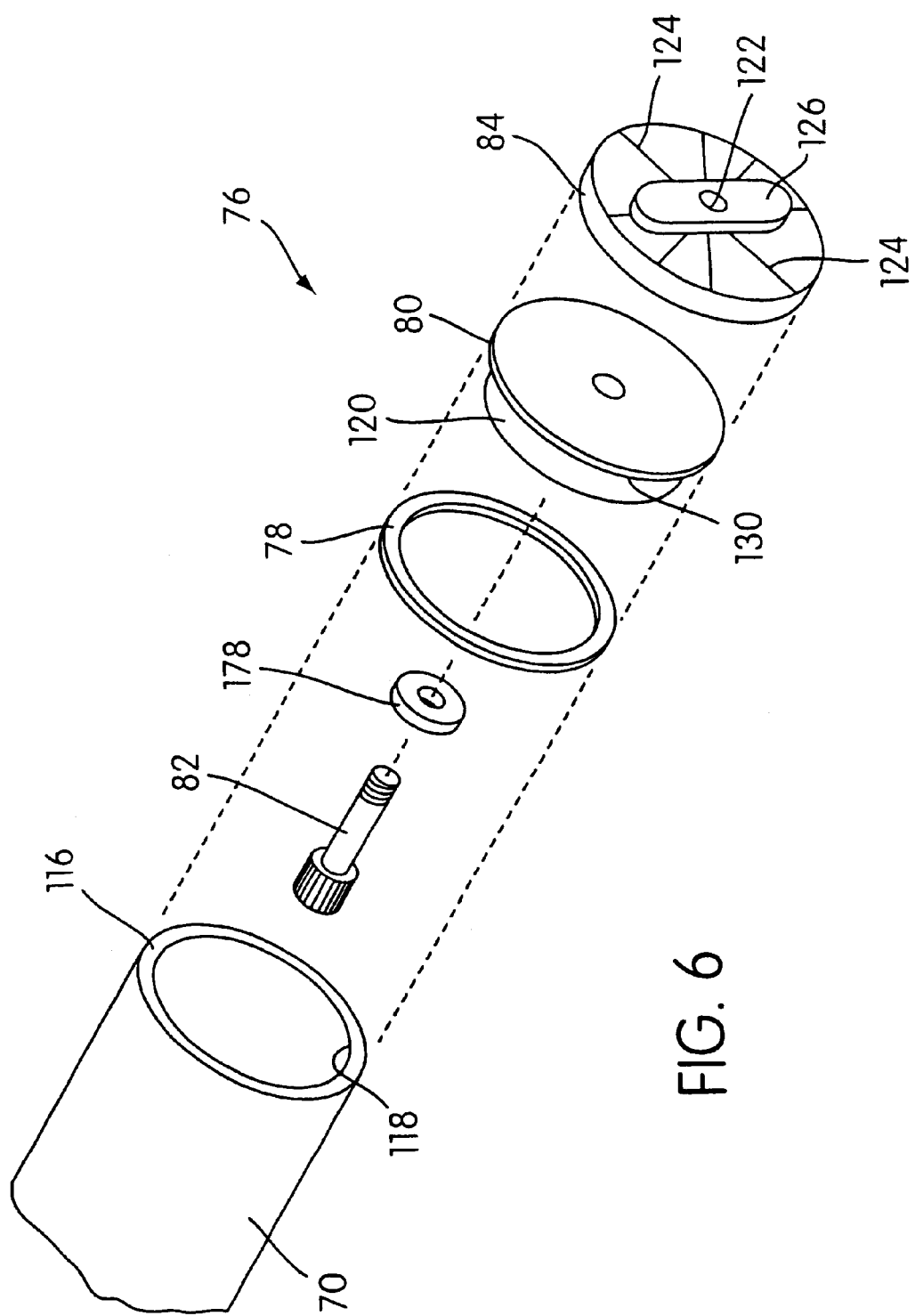
FIG. 6 is perspective exploded view of the mounting structure shown in FIG. 4.

The feed roll mounting structures 76 are configured and positioned to engage opposite ends of the feed roll core 70 of the upper and lower feed rolls 60 and 62. In FIG. 4, one end of the feed roll 60 is shown about which the roll of stock material 66 is wound, but it should be noted that although feed roll 60 is shown, either feed roll 60 or 62 with its respective stock materials 66 or 68 could be represented. As shown in FIGS. 5 and 6, the feed roll core 70 is preferably a cylinder of plastic or cardboard and has an end face 116. Each roll core 70 also has an interior wall 118 configured to receive the mounting cap 80. The mounting cap 80 may be of molded plastic or other similar material having an interior annular wall 120. The interior annular wall 120 is positioned slightly inwardly of the end 116 of the feed roll core 70 and may be adhesively secured in place to the interior wall 120 of the mounting cap 80 thereof.

As best shown in FIGS. 5 and 6, the mounting cap 80 abuts the protecting ring 78, which is preferably made from rubber or a similar material. In turn, the rubber protecting ring 78 abuts the end face 116 of the core 70. The mounting cap 80 has about an equal diameter as that of the core 70. The circular end cap 84 abuts the mounting cap 80 and has a central cylindrical aperture 122 configured to receive the threaded shaft of fastener 82. Reinforcing ribs 124 project outwardly from the end cap 84 with a raised mounting projection 126 centrally positioned on the end cap 84 and having the cylindrical aperture 122 therethrough. A washer 128 is interposed between the head of the fastener 82 and the interior surface 130 of the mounting cap 80 so to determine the frictional resistance that exists between the interior surface of the end cap 84 and the end face 116 of the feed roll core 70. This tension is pre-adjusted by the manufacturer to provide the proper roll tension depending upon the type of material, size of the material, thickness of the material and any other possible factors.

The raised mounting projections 126 extend outwardly from the upper feed roll 60 and are slidably received in the vertical mounting projection slots 32. Similarly, the raised mounting projections 126 extend outwardly from the lower feed roll 62 and are slidably received in the horizontal mounting projection slots 46.

The pre-tensioning feature described above may be achieved by using the construction disclosed in U.S. Provisional Application of Lemens, Ser. No. 60/248,217, the entirety of which is incorporated into the present application by reference. Also, the pre-tensioning feature may be provided by brakes that are built into the apparatus itself, not in the feed rolls. However, the pre-tensioning feature is not necessary and may be eliminated.

The exit tray assembly 104 is constructed of plastic and has a generally rectangular substrate supporting surface 132 with a plurality of generally parallel ridges 134 thereon extending longitudinally away from the nip rollers. The lip 136 has the same height as the aforementioned ridges 134 and extends around the periphery of the exit tray assembly 104 on three sides. The supporting surface 132 of the exit tray assembly 104 is textured and the forward edge 108 of the exit tray assembly 104 extends inwardly such that it is disposed immediately adjacent the rearward side of the nip area.

Operation

During manufacturing, after the stock materials have been wound up on rolls 60, 62, the lead end portions 72 and 74 of the stock materials 66, 68, respectively, are adhesively bonded together to form the lead end portion 64. A fixture with a narrow slot may be used to facilitate such engagement or it may be performed manually. The lead end portions of 72 and 74 are flushly positioned with one another for feeding between the upper and lower cooperating structures 52 and 54 when a user inserts the lead end portion 64 therebetween.

As previously stated, various substrates may be provided to the user in a ready-to-use cartridgeless feed roll assembly 16 with the cartridgeless feed roll assembly 16 being held together prior to insertion into the apparatus 10 with packaging such as cardboard, tape or removable end caps. The user simply selects the appropriate cartridgeless feed roll assembly 16, individually mounts the separate feed rolls 60 and 62 to the frame 12 of the apparatus 10 and inserts the bonded lead end portion 64 between the cooperating structures 52, 54 of the master processing assembly 14. Then, the user can perform the master processing operation at his/her convenience.

As shown in FIGS. 1 and 2, the feed tray assembly 90 is removably inserted on the top edge 38 in a generally horizontal position and transversely extends thereacross with the projections 94 removably inserted in the slots 96 on the lower side wall portions 28. The tapered edge 98 engages the angled walls 44 of the upper side wall portions 30 and transversely extends thereacross. The master is aligned on the upper surface 92 of the feed tray assembly 90 with the leading free edge of the master positioned between the inner surfaces of the materials supplied by the lower feed roll 62 and the upper feed roll 60 of the cartridgeless feed roll assembly 16.

After the feed tray assembly 90 is placed in position, a master such as a pre-printed card is placed on the feed tray assembly 90 and fed into the nip area of the master processing assembly 14 with the stock materials on opposing sides thereof.

As the master and the stock materials 66 and 68 supplied by the upper and lower supply feed rolls 60 and 62, respectively, are fed into the nip area of the master processing assembly 14, the wiper bar 100 lightly engages the master as it passes between the wiper bar 100 and the upper planar surface 92 of the feed tray assembly 90. The wiper bar 100 cleans, smoothes, and guides the master as it enters the nip area between the cooperating structures 52, 54. The wiper bar 100 also tensions the master and keep it flat and aligned with the laminate or adhesive webs resulting in better alignment, especially when feeding the masters intermittently.

The operator then actuates the machine by operating the actuator 18, more specifically, the crank handle 86 to perform the master processing operation by rotating the upper cooperating structure 52 and the lower cooperating structure 54 as discussed above. The cooperating structures 52, 54 cooperate to advance the master and stock materials through the master processing assembly 14 and the finished product is dispersed on to exit tray assembly 104. As the cooperating structures 52, 54 advance the master and stock materials 60, 62, the cooperating structures 52, 54 cooperate to apply pressure to these substrates so as to activate the pressure-sensitive adhesive carried by one or both of the stock materials 60, 62 to affect adhesive bonding between the master and stock materials 60, 62.

For lamination operations, each stock material would be coated with pressure sensitive adhesive so that bonding is affected between both stock materials 60, 62 and on both sides of the master. For adhesive transfer operations, only one of the stock materials 60, 62 would be coated with pressure sensitive adhesive so that the adhesive is bonded to one side of the master and to the portions of the uncoated stock material. The uncoated stock material is peeled back to remove the excess adhesive from around the periphery of the master.

The exit tray assembly 104 is configured to receive the finished product of a laminating or adhesive transfer operation performed by the apparatus 10. As the finished product is fed through the master processing assembly 14, the exit tray assembly 104 receives and supports the finished product in a generally horizontal orientation. The ridges 134 support the finished product slightly above the supporting surface 132. By supporting the finished product in a generally horizontal orientation, the exit tray assembly 104 enhances the laminating or adhesive transfer process by preventing the finished product from falling downward and bending or curling due to a shrinkage differential which occurs in the manufacturing of the substrate layers used to make the finished product. By eliminating bending or curling of the finished product, the exit tray assembly 104, in conjunction with the laminating and adhesive transfer apparatus 10, provides a straighter and flatter finished product, which is generally more desirable than a bent or curled finished product.

When it is desired to cut the finished product, the blade mounting structure 114 may be slid transversely across the cutter bar 112 such that the blade is moved transversely within the groove and cuts through the entire thickness of the finished product in one pass.

The principles of the present invention may be applied to any type of stock materials or combination thereof, including laminating films, adhesive transfer films, films made of magnetic resin, adhesive mask films and the like.

While the principles of the invention have been made clear in the illustrative embodiments set forth above, it will be obvious to those skilled in the art to make various modifications to the structure, arrangement, proportion, elements, materials, and components used in the practice of the invention.

Any U.S. Patents or patent applications mentioned herein above and not specifically incorporated by reference are hereby incorporated into the present application by reference.

It will thus be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed:

1. A packaged cartridgeless feed roll assembly to be used in conjunction with a master processing apparatus for processing a master, the apparatus comprising a frame, and a master processing assembly comprising a pair of cooperating structures constructed and arranged to receive substrates therebetween, the processing assembly being constructed and arranged to perform a master processing operation wherein said cooperating structures apply pressure to the substrates received therebetween and then subsequently discharge the substrates, said packaged cartridgeless feed roll assembly comprising:
    a feed roll assembly comprising:
        a first feed roll carrying a supply of a first stock material having a lead end portion; and
        a second feed roll carrying a supply of a second stock material having a lead end portion, at least one of said first and second stock materials carrying a layer of adhesive;
        said feed rolls being joined together without the use of a cartridge body structure as a result of said lead end portions of said stock materials being secured together with side edges of said stock materials substantially aligned with one another;
        said first and second feed rolls being removably and individually mountable to said frame to enable the secured lead end portions of said stock materials to be fed together between said cooperating structures of said master processing assembly so as to enable the aforesaid master processing operation to be performed by advancing the master and the stock materials through said master processing assembly with said cooperating structures applying pressure to said stock materials so as to cause adhesive bonding between said stock materials and the master and then subsequently discharge the processed master and stock materials; and
    a feed roll assembly package, said first and second feed rolls being received in said package such that said package limits relative movement of said feed rolls in a manner that prevents the lead end portions of said feed rolls from becoming separated from one another.

2. A packaged cartridgeless feed roll assembly according to claim 1, wherein each of said stock materials has a layer of adhesive thereon.

3. A packaged cartridgeless feed roll assembly according to claim 2, wherein said lead end portions of said stock materials are secured together by adhering said lead end portions together via said adhesive layers.

4. A packaged cartridgeless feed roll assembly according to claim 1, wherein said adhesive is pressure-sensitive adhesive.

5. A packaged cartridgeless feed roll assembly according to claim 4, wherein said lead end portions of said stock materials are secured together by adhering said lead end portions together via said adhesive layers.

6. A packaged cartridgeless feed roll assembly according to claim 1, wherein said adhesive is heat-sensitive adhesive.

7. A packaged cartridgeless feed roll assembly according to claim 6, wherein said lead end portions of said stock materials are secured together by adhering said lead end portions together via said adhesive layers.

8. A packaged cartridgeless feed roll assembly according to claim 1, further comprising a clip securing said lead end portions of said stock materials together, a thickness of said clip being small enough to enable said clip to be fed between the cooperating structures of said master processing assembly along with the lead end portions of said feed rolls.

9. A packaged cartridgeless feed roll assembly according to claim 6, further comprising a clip securing said lead end portions of said stock materials together, a thickness of said clip being small enough to enable said clip to be fed between the cooperating structures of said master processing assembly along with the lead end portions of said feed rolls.

10. A packaged cartridgeless feed roll assembly according to claim 1, wherein said feed roll package has a pair of feed roll retaining structures, said feed rolls being received in said feed roll retaining structures, said feed roll retaining structures being configured to limit relative movement of said feed rolls within said feed roll package.

11. A packaged cartridgeless feed roll assembly according to claim 10, wherein said feed roll retaining structures have concave feed roll receiving surfaces configured to complement an outer circumference of said feed rolls.

12. A packaged cartridgeless feed roll assembly according to claim 10, wherein said feed roll package has an outer shell that encloses said feed rolls and wherein said feed roll retaining structures provided by an insert mounted within said outer shell.

13. A packaged cartridgeless feed roll assembly according to claim 12, wherein said outer shell and said insert are formed from cardboard or plastic.

14. A packaged cartridgeless feed roll assembly according to claim 1, wherein said feed rolls each have a pair of feed roll mounting structures on opposing ends thereof, said feed roll mounting structures being configured to be received in a mated relationship with corresponding feed roll mounting structure on said master processing apparatus.

15. A packaged cartridgeless feed roll assembly according to claim 14, wherein said feed roll mounting structures apply friction to cores of said feed rolls to resist unwinding of said stock materials, thereby tensioning said stock materials during unwinding thereof.

* * * * *